United States Patent [19]
Callahan

[11] 3,985,187
[45] Oct. 12, 1976

[54] TWO-WAY PLOW WITH CARRYING BRACKET THEREFOR

[76] Inventor: Irvin J. Callahan, 107 11th Ave. North, Nampa, Idaho 83651

[22] Filed: Nov. 26, 1975

[21] Appl. No.: 625,298

[52] U.S. Cl. .............................. 172/224; 172/271
[51] Int. Cl.² .................... A01B 3/42; A01B 61/04
[58] Field of Search .......... 172/204, 224, 225, 226, 172/227, 261, 271; 280/451; 403/2, 24, DIG. 3

[56] References Cited
UNITED STATES PATENTS

| | | | |
|---|---|---|---|
| 2,609,740 | 9/1952 | Dexheimer, Jr. et al. | 172/225 |
| 3,087,556 | 4/1963 | Pursche | 172/224 |
| 3,517,748 | 6/1970 | Fischer | 172/224 |
| 3,662,840 | 5/1972 | Richey | 172/224 |

FOREIGN PATENTS OR APPLICATIONS

| | | | |
|---|---|---|---|
| 940,528 | 5/1948 | France | 172/271 |
| 1,036,052 | 4/1953 | France | 172/271 |

Primary Examiner—Richard T. Stouffer

[57] ABSTRACT

The plow carrying brackets are employed in pairs, each comprising a L-shaped shank pivotally mounted at one of their ends to the drawbar of a plow frame, the interior vertex of the shank engaging a rest which issues sidewardly from the drawbar and secured by a shear pin through the upstanding leg portions of the crossing shanks. The interior vertex of the shanks is an obtuse angle which juxtaposes the plow point of the plow bottom carried by the bracket directly beneath the pivot point of the bracket.

1 Claim, 2 Drawing Figures

TWO-WAY PLOW WITH CARRYING BRACKET THEREFOR

FIELD OF THE INVENTION

The present invention relates to plows, and more particularly to a plow carrying bracket operable to release plow face encounted obstruction.

BACKGROUND OF THE INVENTION

In a conventional plow, where the hinge or pivot of the shank if behind the plow point. The plow bottom is forced in an arc downwardly into the soil. When the plow encounters a hard object the whole plow is lifted out of the furrow and dropped on the leeward side of the obstruction. Where the plow is heavy, and there is considerable speed which creates a substantial shock and ofttimes severely damaged. Plow bottom release mechanisms have been offered to remedy the situation. Conventionally these plow bottom releases have employed springs, or pressurized hydraulic cylinders, which urge the plow bottom into the soil. However, if abnormally hard soil conditions are encountered the release mechanism may be overcome simply due to hardness and compaction, rather than to obstructions.

Accordingly, it is an object to the present invention to provide a plow bottom release which releases only are encountering rocks or other obstructions.

It is a further object of this invention that the present bracket have its bearing point directly above the plow point such that when release occurs the plow bottom immediately rises to clear the obstruction.

It is a further object to this invention that the present plow bottom release be of simplicity of construction vis-a-vis mechanical and hydraulic resets to permit economy of manufacture and reliability in operation.

These and other objects shall become apparent from the description following, it being understood that modifications may be made without affecting the reachings of the invention here set out.

DETAILED DESCRIPTION OF THE PREFERRED EMBODIMENT

Figure 1:
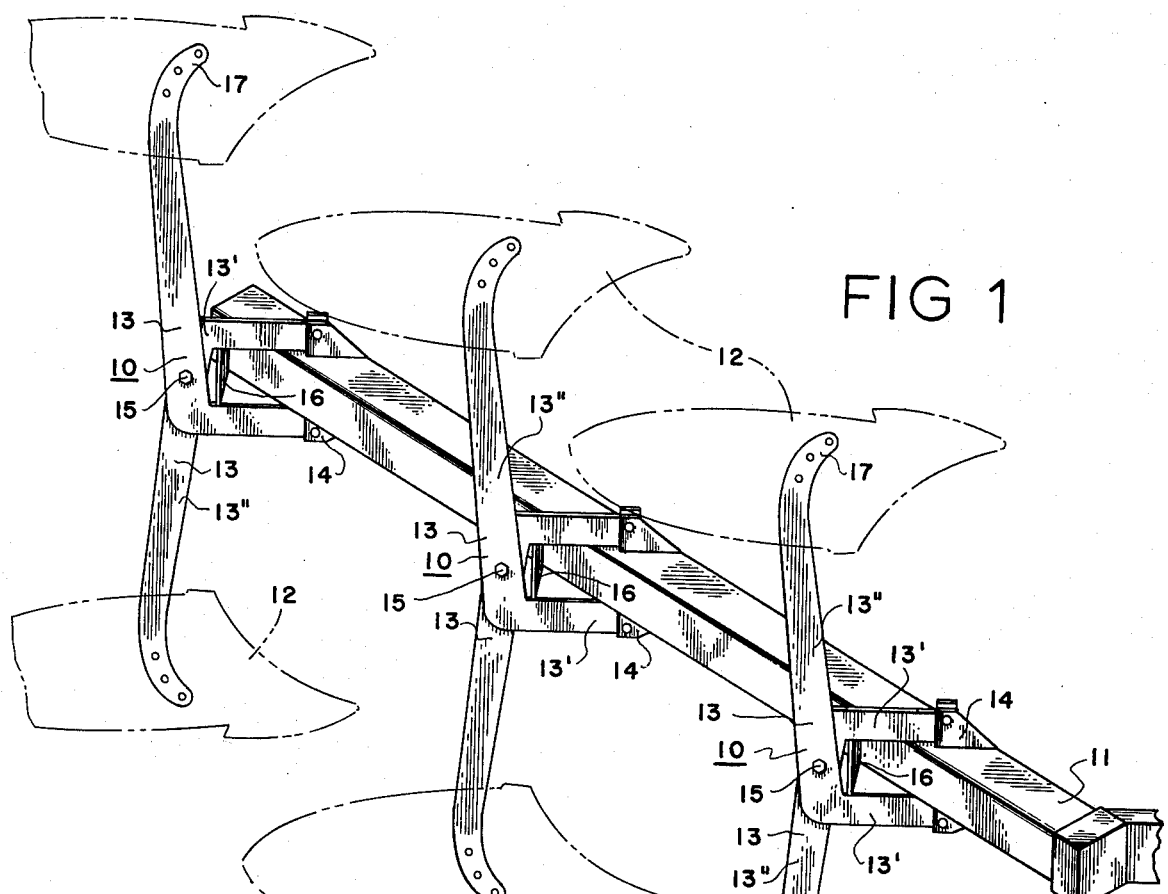
FIG. 1 is a perspective view of the plow bottom carrier of this invention shown in the environment of a two-way plow shown in broken lines for illustrative purposes.

Referring now to the drawings and more particularly to the FIG. 1, the plow carrying bracket of this invention is shown to advantage and generally identified by the numeral 10. The bracket 10 is intended to be carried on a drawbar 11, and carry tillage implements such as, moldboard plow bottoms 12. Although a two-way plow drawbar 11 is shown and described herein, other plow configurations may be employed to satisfactorily effect. Each plow bracket 10 is projected substantially perpendicularly from rectilinear centerline of the drawbar 11. There are superimposed brackets 10 with plow bottoms 12 are disposed at intervals along the drawbar 11.

Figure 2:
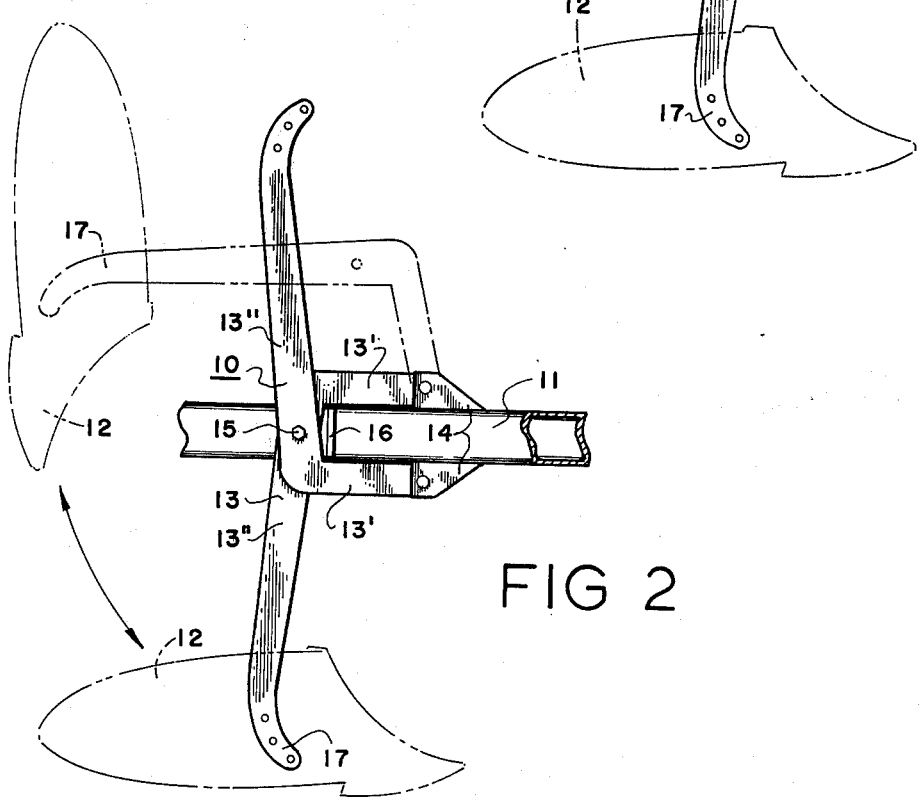
FIG. 2 is fragmentary side-elevational view of the mounting bracket of the present plow bottom carrier shown with the respective brackets in various operating positions in broken lines for illustrative purposes.

As shown more clearly in the FIG. 2, each bracket comprises a shank 13, a flange 14 by which the shank 13 is pivotally mounted to the drawbar 11, and a shear pin 15 which secures the shanks 13 in their upstanding position. Each shank 13 is a substantially L-shaped member having a riser 13', which issues sidewardly and rearwardly from the normally upper and lower terminal sides of the drawbar 11. The flange 14 joins the terminal end of the riser 13'. The shank 13'' issues at an obtuse angle from the riser 13'. The riser 12' is of a length suitable to juxtapose the interior vertex of the riser 13', and the shank 13'' at the drawbar 11, in the normal operating position. A pair of shanks 13 are mounted opposingly at the normally upper and lower terminal sides of the drawbar 11. Their intersections contacting at their leg portions 13''. The shear pin 15 is disposed at the intersection through the respective shanks 13. The interior edges of the respective risers 13', which normally are adjacent the drawbar 11 engage a rest 16, which issues sidewardly from the drawbar 11. More particularly, the interior vertices of the shanks 13 engage the rest 16 in the normal operating position shown in the FIG. 2.

As shown in the FIG. 1 the outermost terminal ends of the leg portions 13'' carry the plow bottoms 12 on flanges 17, which are a part of the shanks 13. The angle of the centerlines of the riser 13' and the leg 13'' is such that the plowpoint of the plow bottom 12 is directly under the pivot point of the flange 14. The flange 16 mounting the plow bottom 12 normally results in a center of gravity of the bracket 10 and plow 12 which is forward the flange 14; therefore, plow bottoms 12 being carried over the drawbar 11 is a two-way plow will remain in their resting positions against the rest 16.

Referring to the FIGS. 1 and 2 the brackets 10 are normally carried as described above with the shanks secured to the flanges 14 engaging the rest 15, and secured adjacent the rest 16 by the shear pin 15. The shear pin 15 is secured as described above. The shear pin 15 has a hardness determined by its shear strength selected for the release requirements of the drawbar 11 and the plow bottoms 12. That is, when the plow bottom 12 encounters an obstruction which exceeds the preselected shear strength of the pin 15, the pin 15 is caused to break, and the bracket 10 pivots on the flange 14 over the obstruction. Load less than the predetermined shear strength of the pin 15 (e.g. hard soil) would not permit the bracket 10 to raise the plow bottom 12.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A two-way plow including a pair of carrying brackets mounted on a drawbar, each bracket comprising an L-shaped shank pivotally mounted at one of its terminal ends to said drawbar and extending rearwardly therefrom, the interior vertex of said shank engaging a rest which issues sidewardly from said drawbar, said shanks being pivotally mounted to opposing sides of said drawbar and crossing past each other from one of said sides to the other at adjacently disposed vertically upstanding leg portions of said shanks, said leg portions issuing outwardly with respect to said rest, and secured together by a shear pin disposed through said adjacently disposed leg portions, a plow bottom projecting forwardly from the other terminal end of each of said shanks, the angle between the respective leg portions forming each said L-shaped shank being such that the location of the pivotal mounting of each said bracket on said drawbar is substantially vertically aligned with the plow point formed by said plow bottom.

* * * * *